(12) United States Patent
Chen et al.

(10) Patent No.: US 7,375,922 B2
(45) Date of Patent: May 20, 2008

(54) MOUNTING APPARATUS FOR DATA STORAGE DEVICE

(75) Inventors: Yun-Lung Chen, Tu-cheng (TW); Xi-Hua Jiang, Shenzhen (CN)

(73) Assignees: Hong Fu Jin Precision Industry (Shenzhen) Co., Ltd., Bao-an District, Shenzhen, Quangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 511 days.

(21) Appl. No.: 10/949,475

(22) Filed: Sep. 24, 2004

(65) Prior Publication Data
US 2005/0088778 A1   Apr. 28, 2005

(30) Foreign Application Priority Data
Oct. 28, 2003  (TW)  .............................. 92219091 U

(51) Int. Cl.
*G11B 33/14* (2006.01)
(52) U.S. Cl. .............................. 360/97.02; 360/97.01; 360/97.03; 360/98.01; 369/263.1; 720/654; 720/655; 720/657
(58) Field of Classification Search .............. 360/97.01, 360/97.02, 97.03, 98.01; 369/263.1; 720/654, 720/655, 657
See application file for complete search history.

(56) References Cited

U.S. PATENT DOCUMENTS

| | | | | |
|---|---|---|---|---|
| 4,683,520 A | * | 7/1987 | Grassens et al. ............. | 361/825 |
| 5,004,207 A | * | 4/1991 | Ishikawa et al. ............. | 248/632 |
| 5,349,483 A | | 9/1994 | Tsai ........................ | 360/97.01 |
| 5,564,804 A | * | 10/1996 | Gonzalez et al. ........ | 312/223.2 |
| 6,005,768 A | * | 12/1999 | Jo ............................... | 361/685 |
| 6,341,949 B1 | * | 1/2002 | Garloch ...................... | 417/363 |
| 6,377,447 B1 | * | 4/2002 | Boe ........................... | 361/685 |
| 6,583,949 B2 | * | 6/2003 | Maiers .................... | 360/97.01 |
| 2003/0128524 A1 | * | 7/2003 | Chen .......................... | 361/725 |
| 2003/0173879 A1 | * | 9/2003 | Mizrahi .................. | 312/330.1 |
| 2003/0206397 A1 | * | 11/2003 | Allgeyer et al. ............ | 361/685 |

FOREIGN PATENT DOCUMENTS

| | | | |
|---|---|---|---|
| JP | 2000076837 | * | 3/2000 |
| TW | 314216 | | 8/1997 |
| TW | 371062 | | 9/1999 |
| TW | 389362 | | 5/2000 |

* cited by examiner

*Primary Examiner*—Andrea Wellington
*Assistant Examiner*—Carlos E Garcia
(74) *Attorney, Agent, or Firm*—Morris Manning Martin LLP; Tim Tingkang Xia, Esq.

(57) ABSTRACT

A mounting apparatus for securing a data storage device (10) defining a number of fixing apertures (101) includes a bracket assembly (20), and a number of resilient gaskets (30). The bracket assembly comprises a first bracket (210), and a second bracket (220). The first bracket comprises a bottom panel (211), and a side panel (212). The second bracket includes a vertical plate (222) secured to the bottom panel of the first bracket. A number of positioning strips (204) some with a tab (206) extend perpendicularly from the bracket assembly to position the resilient gaskets respectively. The vertical plate is resiliently and outwardly moved to sandwich the data storage device in the bracket assembly. The data storage device is secured with the tabs engaging with the fixing apertures thereof.

14 Claims, 4 Drawing Sheets

MOUNTING APPARATUS FOR DATA STORAGE DEVICE

BACKGROUND OF THE INVENTION

1. Field of the Invention

The present invention relates to a mounting apparatus for a data storage device, and more particularly to an apparatus which is convenient to use and has good shock absorbing ability

2. Description of Related Art

A typical data storage device mounting assembly is usually directly mounted to a computer case with a plurality of screws. However, a screwdriver or other detaching toolings are necessary for installation or removal of the screws, which causes inconvenience and time-consuming issues in the data storage device assembly or disassembly process.

A typical data storage device mounting assembly is disclosed in U.S. Pat. No. 5,349,483. The hard disk mounting assembly comprises a container, a hard disk drive (HDD) and a cover. A top face of the container defines a rectangular entrance and four screw holes are defined at four corner portions of the rectangular container. The HDD defines a plurality of screw apertures at a top face thereof. The cover defines a plurality of fixing openings corresponding to the screw apertures of the HDD and the screw holes of the container. A plurality of bolts penetrates respectively through the fixing openings of the cover and is received in corresponding screw apertures of the HDD, thereby connecting the cover with the HDD. The HDD is received in the container and fixed to the container by screws penetrating through the fixing openings of the cover and received in the corresponding screw holes of the container. However, the conventional hard disk mounting assembly disclosed above must utilize a screwdriver or other detaching tooling for installation or removal of the screws, which causes time-consuming issue in the hard disk assembly or disassembly process. In addition, mounting or detaching the HDD by means of a screwdriver or other additional tools in the limited inner space of a computer case is unduly inconvenient.

Another typical data storage device mounting assembly is disclosed in Taiwan Patent Publication No. 371062. The hard disk mounting assembly comprises a chassis and a fixing bracket. A HDD is contained in the bracket. The chassis forms a pair of first slideways and defines a pair of screw apertures. A top face of the fixing bracket forms a pair of second slideways paralleling with each other corresponding to the first slideways of the chassis and a pair of fixing pieces perpendicularly extending from the top face of the bracket. Each fixing piece defines a fixing hole. In assembly, the HDD is received in the bracket. The second slideways of the bracket slide along the first slideways of the chassis. A pair of bolts respectively penetrates through the corresponding fixing holes of the bracket and is partially received in the screw apertures of the chassis, thereby mounting the HDD to the chassis. However, a suspension attaching means adopted in the conventional data storage device mounting assembly disclosed thereof often causes vibration issue and can hardly provide a firm fixation of the HDD. In addition, the bracket of the conventional data storage device mounting assembly is attached to the chassis by screws. A screwdriver or other detaching tools for installation or removal of the screws is necessary, which is unduly inconvenient and laborious. Furthermore, the directly attaching means of the conventional data storage device mounting assembly hardly absorbs any vibration of the bracket or the chassis.

SUMMARY OF THE INVENTION

Accordingly, an object of the present invention is to provide a data storage device mounting assembly with a simplified configuration, which is convenient to use and has good shock absorbing ability.

To achieve the above object, a mounting apparatus for securing a data storage device comprises a bracket assembly, and a plurality of resilient gaskets. The data storage device defines a plurality of fixing apertures. The bracket assembly comprises a first bracket, and a second bracket. The first bracket comprises a bottom panel, and a side panel extending upwardly from the bottom panel. The second bracket comprises a vertical plate, and horizontal plate perpendicular to the vertical plate. The horizontal plate is secured to the bottom panel of the first bracket. The vertical plate is moved outwardly relative to the first bracket when the data storage device is placed into the bracket assembly. A plurality of positioning strips extends perpendicularly from the bracket assembly to position the resilient gaskets respectively. A tab extends from some of the positioning strips to engage in the fixing holes of the storage device.

Other objects, advantages and novel features of the present invention will be drawn from the following detailed description of preferred embodiment of the present invention with the attached drawings, in which:

DETAILED DESCRIPTION OF THE INVENTION

Figure 1:
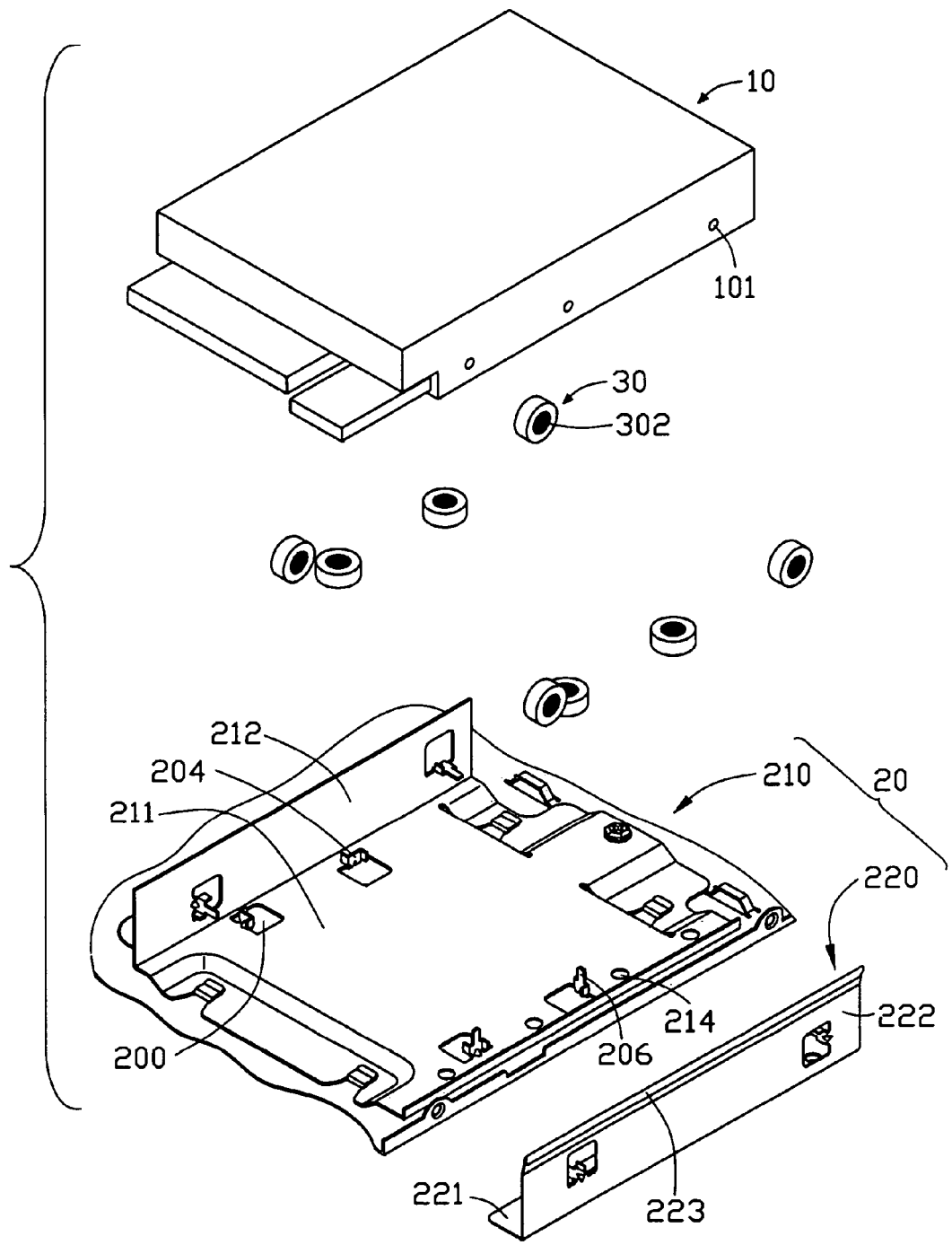
FIG. 1 is an exploded, isometric view of a data storage device mounting apparatus in accordance with a preferred embodiment of the present invention comprising a data storage device, a first bracket, a second bracket, and a plurality of resilient gaskets.

Referring to FIG. 1, a data storage device mounting apparatus in accordance with the preferred embodiment of the present invention comprises a bracket assembly 20 for receiving a data storage device 10 therein, and a plurality resilient gaskets 30 attached to the bracket assembly 20. A plurality of fixing apertures 101 is defined in sidewalls and a bottom wall of the data storage device 10. The mounting apparatus is applied in an electronic device (not shown).

Figure 2:
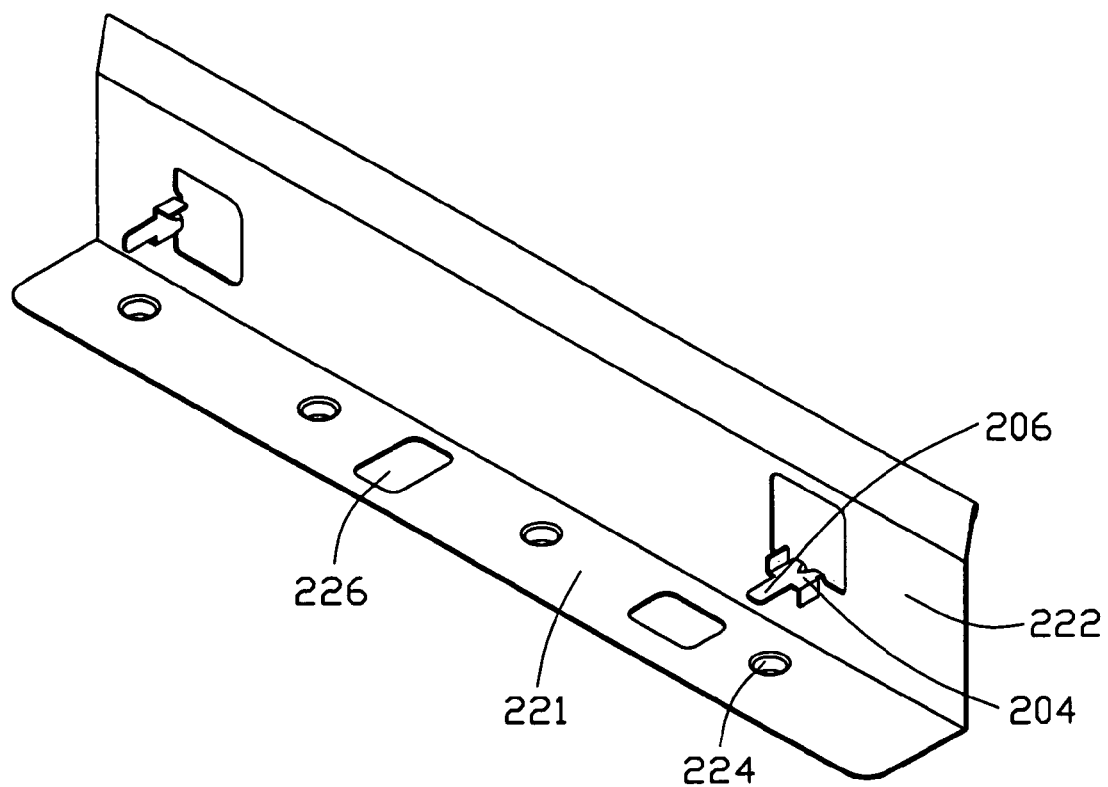
FIG. 2 is an enlarged view of the second bracket of FIG. 1, but viewed from another aspect.

Also referring to FIG. 2, the bracket assembly 20 comprises a first bracket 210, and a second bracket 220 assembled to the first bracket 210. The first bracket 210 comprises a bottom panel 211, and a side panel 212 extending upwardly from a left edge of the bottom panel 211. A plurality of mounting holes 214 is defined in the bottom panel 211 far away the side panel 212. The second bracket 220 generally has an L-shaped configuration. The second bracket 220 comprises a horizontal plate 221, and a vertical plate 222 perpendicularly extending from a right edge of the horizontal plate 221. A folded flange 223 extends upwardly and slantways from a top edge of the vertical plate 222, for facilitating manual grabbing. A plurality pairs of slots 200 are separately defined in the side panel 212 and the bottom panel 211 of the first bracket 210, and the vertical plate 222 of the second bracket 220. A positioning strip 204 extends perpendicularly from an edge of each slot 200. The positioning strip 204 generally has a Z-shaped profile. Each pair of positioning strips 204 is perpendicularly and respectively arranged on the side panel 212 and the bottom panel 211 of the first bracket 210, and the vertical plate 222 of the second bracket 220. A plurality of seats 224 extends downwardly from the horizontal plate 221, corresponding to the mounting holes 214 of the first bracket 210. A plurality of openings 226 is defined in the horizontal plate 221, corresponding to the positioning strips 204 of the bottom panel 211 near the mounting holes 214. The middle faces of the paired positioning strips 204 are perpendicular to each other. A tab 206 extends forwardly from an outmost portion of some positioning strip 204, for engaging in a corresponding fixing aperture 101 of the data storage device 10.

The resilient gaskets 30 are made of shock absorbing material, such as rubber. Each resilient gasket 30 defines a through hole 302 therein, for engaging with a corresponding strip 204 of the bracket assembly 20.

Figure 3:
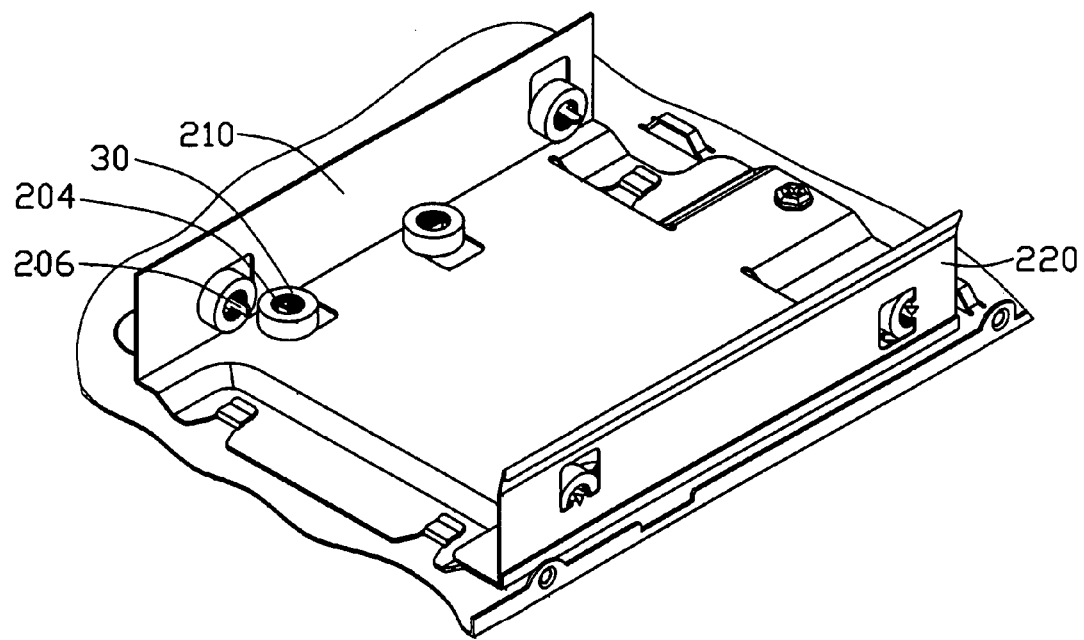
FIG. 3 is a sub assembled view of FIG. 1, without showing the data storage device.
Figure 4:
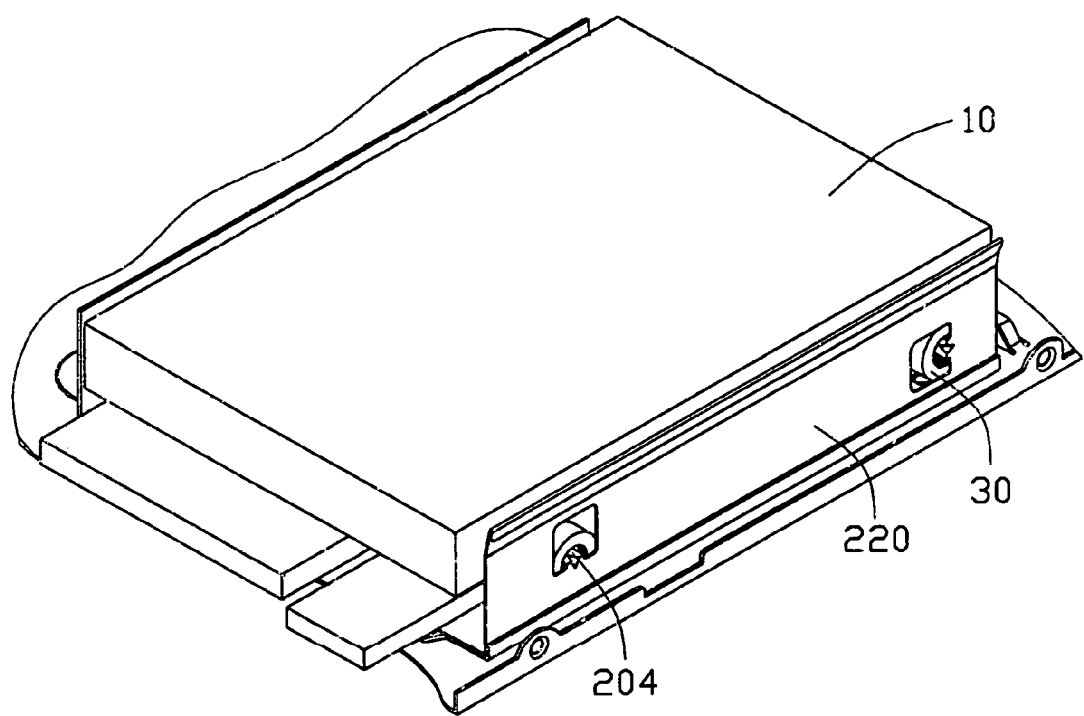
FIG. 4 is an fully assembled view of FIG. 1.

Referring to FIGS. 3-4, in assembly, the second bracket 220 is attached to the first bracket 210, with the seats 224 of the horizontal plate 221 secured in the mounting holes 214 of the bottom panel 211 and the corresponding strips 204 near the mounting holes 214 extending through the openings 226. The seats 224 engage with the mounting holes 214 by any conventional fastening method, such as rivet or weld. The resilient gaskets 30 are attached to the bracket assembly 20, with the positioning strips 204 extending in the through holes 302 of the gasket 30. The tabs 206 extend out from the through holes 302 when the corresponding positioning strips 204 form the tabs 206. When the vertical plate 222 of the second bracket 220 is drawn outwardly by pressing the folded flange 223 manually, the data storage device 10 is placed into the bracket assembly 20 and held by the resilient gaskets 30. The tabs 206 of the first bracket 210 engage in some apertures 101 of the data storage device 10. Then the vertical plate 222 is released and the tabs 206 of the second bracket 220 engage in the other apertures 101 of the data storage device 10. Thereby, the data storage device 10 is secured in the bracket assembly 20. The resilient gaskets are disposed between the data storage device 10 and the bracket assembly. Thus the electronic device together with components therein is protected from vibration generated by systems and enclosures of the electronic device. Similarly, when the electronic device is subjected to vibration or shock, the data storage device 10 is protected.

In disassembly, the vertical plate 222 of the second bracket 220 is drawn outwardly, the tabs 206 of the second bracket 220 disengage from corresponding apertures 101 of the data storage device 10. The data storage device 10 is then easily taken out from the bracket assembly 20.

Alternatively, the tabs 206 of the bottom panel 211 of the first bracket 210 and the corresponding fixing apertures 101 in the bottom wall of the data storage device 10 is not necessarily made.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for mounting a data storage device with fixing apertures defined therein, comprising:

a first bracket comprising a bottom panel, a side panel extending upwardly from the bottom panel and forming at least one positioning strip thereon; and a second bracket comprising a first plate, and a second plate perpendicular to the first plate, the first plate secured to the bottom panel of the first bracket, the second plate forming at least one positioning strip thereon;

wherein the second plate of the second bracket is resiliently deformable relative to the first bracket between a first position where the data storage device is enabled to be inserted between the at least one positioning strip of the side panel of the first bracket and the second plate of the second bracket, and a second position where the at least one positioning strip of the first bracket and the at least one positioning strip of the second bracket are engaged in the corresponding fixing apertures of the data storage device;

wherein a plurality of pairs of slots is defined in the bottom panel and side panel of the first bracket, and the second plate of the second bracket.

2. The mounting apparatus as claimed in claim 1, wherein a plurality of mounting holes is defined in the bottom panel of the first bracket, a plurality of seats extends downwardly from the first plate of the second bracket, corresponding to the mounting holes.

3. The mounting apparatus as claimed in claim 1, further comprising a plurality of resilient gaskets engaging with said positioning strip.

4. The mounting apparatus as claimed in claim 3, wherein the resilient gaskets are made of shocking absorbing material.

5. The mounting apparatus as claimed in claim 1, wherein said at least one positioning strip extends from one edge of the slots.

6. A data storage device mounting assembly comprising:

a data storage device defining at least one fixing aperture;

a bracket assembly securing the data storage device therein, the bracket assembly comprising a first bracket, and a second bracket mounted to the first bracket, a plurality of positioning strips extending from the bracket assembly, at least one of the positioning strips extending a tab at outmost portion thereof engaging in the at least one fixing aperture of the data storage device; and a plurality of resilient gaskets each defining a through hole and engaging with a corresponding positioning strip of the bracket assembly, the resilient gaskets being arranged between the bracket assembly and the data storage device;

wherein the second bracket is resiliently deformable outwardly relative to the first bracket to hold the data storage device in the bracket assembly, the data storage device is secured with the tab of the at least one of the positioning strips engaging in the at least one fixing aperture of the data storage device when the second bracket rebounds to an original state.

7. The mounting assembly as claimed in the claim 6, wherein the resilient gasket is made of shocking absorbing material.

8. The mounting assembly as claimed in the claim 7, wherein the resilient gasket is made of rubber.

9. The mounting assembly as claimed in the claim 6, wherein the positioning strips each has a Z-shaped profile.

10. The mounting assembly as claimed in the claim 6, wherein the first bracket comprises a bottom panel, and a side panel extending perpendicularly from an edge of the bottom panel.

11. The mounting assembly as claimed in the claim 10, wherein a plurality of fixing holes is defined in the bottom panel far away the side panel.

12. The mounting assembly as claimed in the claim 11, wherein the second bracket has an L-shaped configuration and comprises a horizontal plate, and a vertical plate generally perpendicular to the horizontal plate, the horizontal plate is mounted to and abuts on the bottom panel of the first bracket, and is positioned between the data storage device and the bottom panel of the first bracket.

13. The mounting assembly as claimed in the claim 12, wherein a plurality of seats extends downwardly from the horizontal plate, corresponding to the fixing holes of the first bracket.

14. The mounting assembly as claimed in the claim 13, wherein a plurality of slots is defined in the bottom panel and the side panel of the first bracket, and the vertical plate of the second bracket, the positioning strips extend perpendicularly from an edge of the slots.

\* \* \* \* \*